US007801938B2

(12) United States Patent
Suga

(10) Patent No.: US 7,801,938 B2
(45) Date of Patent: Sep. 21, 2010

(54) NUMERIC VALUE DISPLAY METHOD

(75) Inventor: Masanao Suga, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 1013 days.

(21) Appl. No.: 10/553,986

(22) PCT Filed: Apr. 22, 2004

(86) PCT No.: PCT/JP2004/005820

§ 371 (c)(1),
(2), (4) Date: Oct. 20, 2005

(87) PCT Pub. No.: WO2004/095405

PCT Pub. Date: Nov. 4, 2004

(65) Prior Publication Data

US 2006/0232500 A1 Oct. 19, 2006

(30) Foreign Application Priority Data

Apr. 23, 2003 (JP) .............................. 2003-118297

(51) Int. Cl.
*G06F 7/38* (2006.01)

(52) U.S. Cl. ....................... 708/494; 708/200; 708/490; 708/495; 708/517

(58) Field of Classification Search ................... 345/31, 345/32, 33, 55, 56, 59, 156, 168, 169, 418, 345/619, 672, 682, 684, 685; 715/243, 244, 715/247; 708/200, 490, 494, 495, 504, 512, 708/513, 517; 382/295
See application file for complete search history.

(56) References Cited

U.S. PATENT DOCUMENTS 3,697,960 A * 10/1972 Gordon ...................... 345/418
3,911,262 A * 10/1975 Izumi et al. ................. 708/169
4,409,666 A * 10/1983 Nishiguchi .................. 708/160
4,476,541 A * 10/1984 Boone et al. ................ 708/130

(Continued)

FOREIGN PATENT DOCUMENTS

JP 54-99537 7/1979

(Continued)

*Primary Examiner*—My-Chau T Tran
(74) *Attorney, Agent, or Firm*—Sughrue Mion, PLLC

(57) ABSTRACT

A numeric value display method uses a display processing section. When an operation to read out a numeric value from storage means and display it is executed, if the numeric value has a greater number of digits than the number of digits which can be displayed on a numeric value display device, the display processing section divides the numeric value into a predetermined number of digits and displays a part of the numeric value on the numeric value display device in such a manner that it is possible to know which part of the numeric value is displayed. Moreover, each time operation keys are pressed, the display processing section resets a display diction variable (P) required for controlling the display position for each of the divided parts of digits preset and switches the part of the numeric value to be output to the numeric value display device. Thus, it is possible to provide a numeric value display method capable of displaying a numeric value with a small number of digits which can be displayed, in such a manner that the numeric value can be recognized easily and viscerally without deteriorating the operationality.

4 Claims, 12 Drawing Sheets

U.S. PATENT DOCUMENTS 4,794,553 A * 12/1988 Watanabe et al. ........... 708/160
5,161,118 A * 11/1992 Matsuda et al. ............. 708/542
5,532,946 A * 7/1996 Phipps et al. ............... 708/174
5,995,068 A * 11/1999 Saegusa ........................ 345/30
6,687,720 B1 * 2/2004 Colver et al. ................ 708/162

FOREIGN PATENT DOCUMENTS

JP 54-111436 8/1979
JP 2-111848 U 5/1990
JP 2-133755 U 11/1990
JP 5-128088 A 5/1993
JP 5-342163 A 12/1993
JP 2000-20003 A 1/2000

* cited by examiner

NUMERIC VALUE DISPLAY METHOD

TECHNICAL FIELD

The present invention is related to a numeral value display system capable of displaying numeral values whose digit number exceed such a digit number displayable on a display device, while operation feelings are not seriously deteriorated.

RELATED ART

Conventionally, in such a case that numeral values are displayed whose digit numbers exceed digit numbers displayable on numeral value display devices, there is no way other than such a method that, for example, a decimal number indication is changed into a hexadecimal number indication (refer to, for example, Japanese Laid-open Patent Application No. Hei-05-342163).

However, the conventional techniques own such a problem that operators can hardly understand, for example, hexadecimal numbers in an intuitive manner, and also another problem that this hexadecimal number indication may seriously deteriorate operation feelings.

The present invention is made to solve the above-described problems, and has an object to provide a numeral value display system capable of displaying a numeral value in an easily intuitively understandable form by using a smaller digit number of a display device, while operation feelings are not deteriorated.

DISCLOSURE OF THE INVENTION

To solve the above-described problems, according to Claim 1 of the invention, there is provided with a numeral value display apparatus including: a display processing unit for reading a numeral value stored in a storage member so as to control a display operation; a numeral value display device for displaying information derived from the display process unit; and an operation key for switching the display of the numeral value display device in a manual manner, a numeral value display system, wherein in a case that the display processing unit executes such an operation that the numeral value stored in the storage member is read out to display the read numeral value, if a digit number of the numeral value to be displayed is larger than a displayable digit number of the numeral value display device, the display processing unit controls to subdivide the numeral value into a preset digit number in order that such a fact that which numeral portion of the numeral value to be displayed is displayed can be grasped, and to display a portion of the subdivided numeral values.

According to Claim 2 of the invention, there is provided with the numeral value display system as in claim 1, wherein the operation key includes: at least one of a left key and a right key; and the display processing unit includes: a member for setting a display unit variable which is required to control display positions of the numeral value every preset dividing digit number and for switching a digit portion of the numeral value based upon the display unit variable every time the operation key is depressed.

According to Claim 3 of the invention, there is provided with the numeral value display system as in claim 1, or 2, wherein the display processing unit includes: a member for incrementing the display unit variable when the left key is depressed; a member for decrementing the display unit variable when the right key is depressed; and a member for switching a numeral value portion to be displayed based upon the value of the display unit variable.

According to Claim 4 of the invention, there is provide with the numeral value display system as in claim 1, or 2, wherein the operation key includes: only the left key; and the display processing unit includes: a member for incrementing the display unit variable up to a preset maximum value when the left key is depressed and for changing the maximum value into "0"; and a member for switching a numeral portion to be displayed based upon the value of the display unit variable to display the switched numeral portion.

According to Claim 5 of the invention, there is provided with the numeral value display system as in claim 1, or 2, wherein the operation key includes: both an up key and a down key; and an editing digit variable required to edit a portion of a numeral value which is displayed on the display device every dividing digit number is set to the display, the display processing unit includes: a member for incrementing an editing digit when the up key is depressed; a member for decrementing the editing digit when the down key is depressed; a member for incrementing an editing digit variable when the left key is depressed; a member for decrementing the editing digit variable when the right key is depressed; a member for determining a value of a display unit variable based upon the value of the editing digit variable; and a member for switching a portion of a numeral value to be displayed based upon the value of the display unit variable to display the switched portion of the numeral value and for clearly displaying the relevant editing digit.

According to Claim 6 of the invention, there is provided with the numeral value display system as in claim 1, or 2, wherein the operation key includes: an up key and a down key in addition to the left key; and an editing digit variable required to edit a portion of a numeral value which is displayed on the display device every dividing digit number is set to the display, the display processing unit includes: a member for incrementing an editing digit when the up key is depressed; a member for decrementing the editing digit when the down key is depressed; a member for incrementing an editing digit variable until the digit is reached to an uppermost order digit and for changing the uppermost order digit to 0; a member for determining a value of a display unit variable based upon the value of the editing digit variable; and a member for switching a portion of a numeral value to be displayed based upon the value of the display unit variable to display the switched portion of the numeral value and for clearly displaying the relevant editing digit.

BEST MODE FOR CARRYING OUT THE INVENTION

Now, a description is made of a concrete embodiment of the present invention with reference to drawings.

First Embodiment Mode

Figure 1:
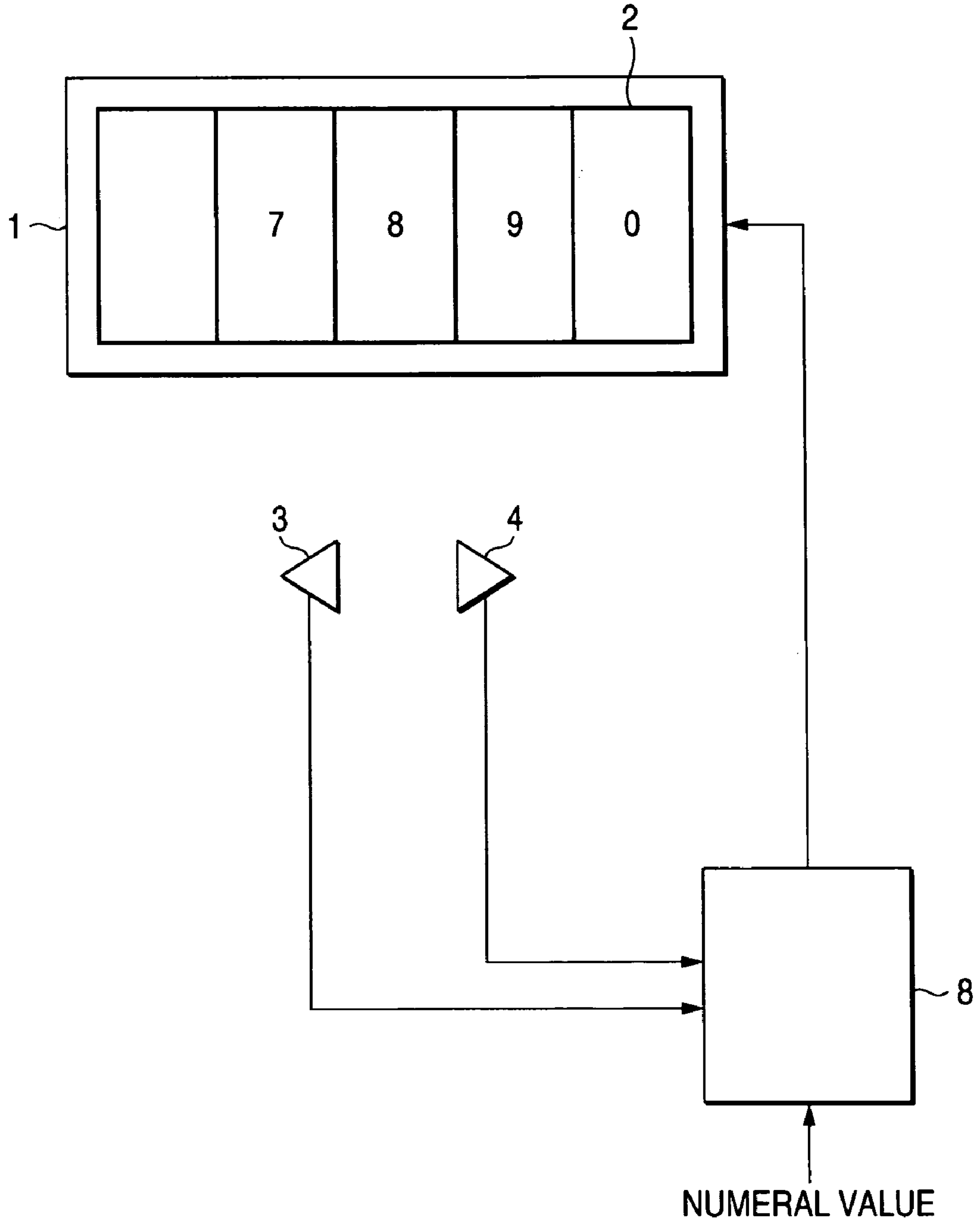
FIG. 1 is a structural diagram for showing a numeral value display apparatus which indicates a first embodiment of the present invention.

FIG. 1 is a structural diagram of a numeral value display apparatus which indicates a first embodiment of the present invention.

Reference numeral 1 shows a numeral value display device, and reference numeral 2 represents one of display units which constitute the numeral value display device 1, and can display one digit of a numeral indication. Reference numerals 3 and 4 show a left key and a right key which constitute operation keys respectively. Reference numeral 8 indicates a display process unit.

A feature of the present invention is given as follows:

That is, in a numeral value display apparatus comprising: the display processing unit 8 for reading a numeral value stored in a storage member (not shown) so as to control a display operation; the numeral value display device 1 for displaying information derived from the display process unit 8; and an operation key for switching the display of the numeral value display device 1 in a manual manner, in the case that the display processing unit 8 executes such an operation that the numeral value stored in the storage member (not shown) is read out to display the read numeral value, the display processing unit 8 is arranged to be controlled that if a digit number of the numeral value to be displayed is larger than a displayable digit number of the numeral value display device 1, then the display processing unit 8 subdivides the numeral value into a preset digit number in order that such a fact that which numeral portion of the numeral value to be displayed is displayed can be grasped, and then, displays a portion of the subdivided numeral values.

Also, while the operation key is arranged by both the left key 3 and the right key 4, the display processing unit 8 includes: a member for setting a display unit variable which is required to control display positions of the numeral value every preset dividing digit number, and for switching digit portions of the numeral value based upon the display unit variable "P" every time the operation key is depressed.

Also, the display processing unit 8 includes: a member (corresponding to steps S100 and S110 in FIG. 2, and will be explained later) for incrementing the display unit variable "P" when the left key 3 is depressed; a member (corresponding to steps S200 and S210 in FIG. 2, and will be discussed later) for decrementing the display unit variable "P" when the right key 4 is depressed; and a member (corresponding to steps S300, S410, S420, and S430 in FIG. 2, and will be explained later) for switching a numeral value portion to be displayed based upon the value of the display unit variable "P." The display process operation will be described in detail with reference to FIG. 2.

Figure 2:
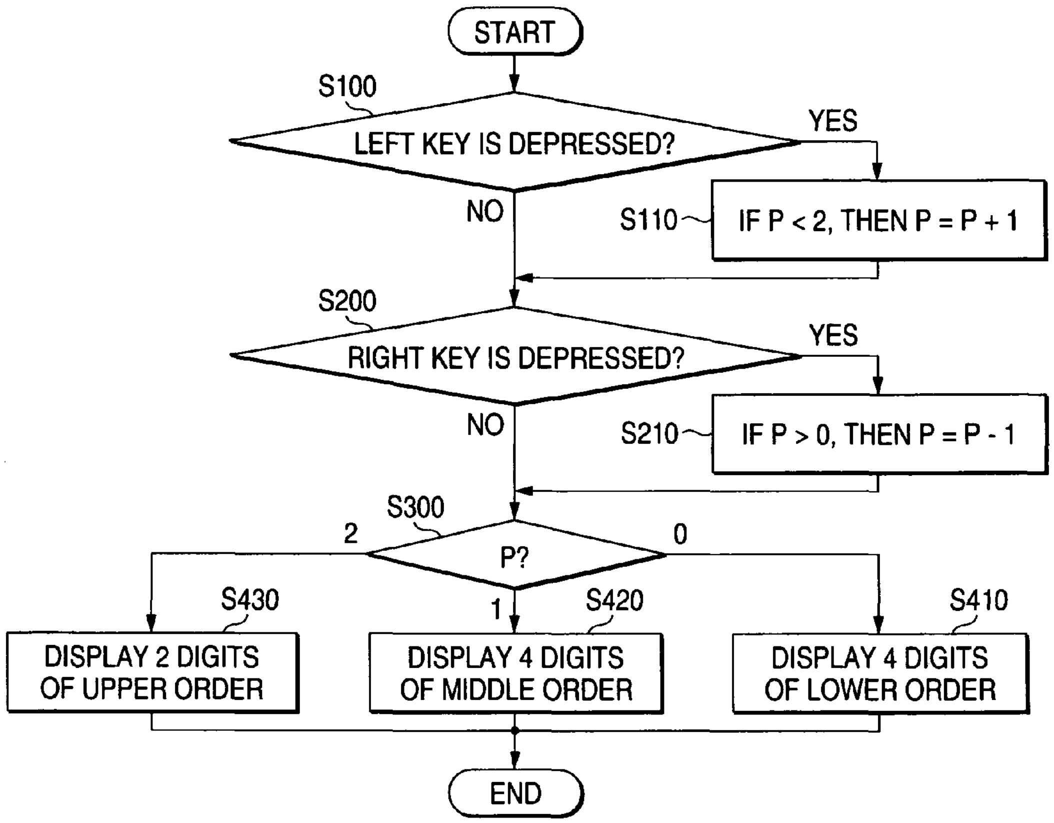
FIG. 2 is a flow chart for describing a display process operation.

FIG. 2 is a flow chart for describing the display process operation.

While the display unit variable "P" takes 0, 1, 2 as the values thereof, when the display unit variable "P" corresponds to each of these values, 4 digits of a lower order are displayed; 4 digits of a middle order are displayed; and 2 digits of an upper order are displayed. Explanations of the display process operations every step are given as follows:

S100: In the case that the left key is depressed, the display process operation is advanced to a step S110. In the case that the left key is not depressed, the display process operation is advanced to a step S200.

S110: When "P" is smaller than 2, 1 is added to "P." When "P" is equal to 2, this "P" remains.

S200: In the case that the right key is depressed, the display process operation is advanced to a step S210. In the case that the right key is not depressed, the display process operation is advanced to a step S300.

S210: When "P" is larger than "0", 1 is subtracted from "P." When "P" is equal to "0", "P" remains.

S300: "P" corresponds to any one of "0", "1", and "2". When "P" corresponds to "0", the display process operation is advanced to a step S410. When "P" corresponds to "1", the display process operation is advanced to a step S420. When "P" corresponds to "2", the display process operation is advanced to a step S430.

S410: 4 digits of a lower order are displayed.

S420: 4 digits of a middle order are displayed.

S430: 2 digits of an upper order are displayed.

Figure 3:
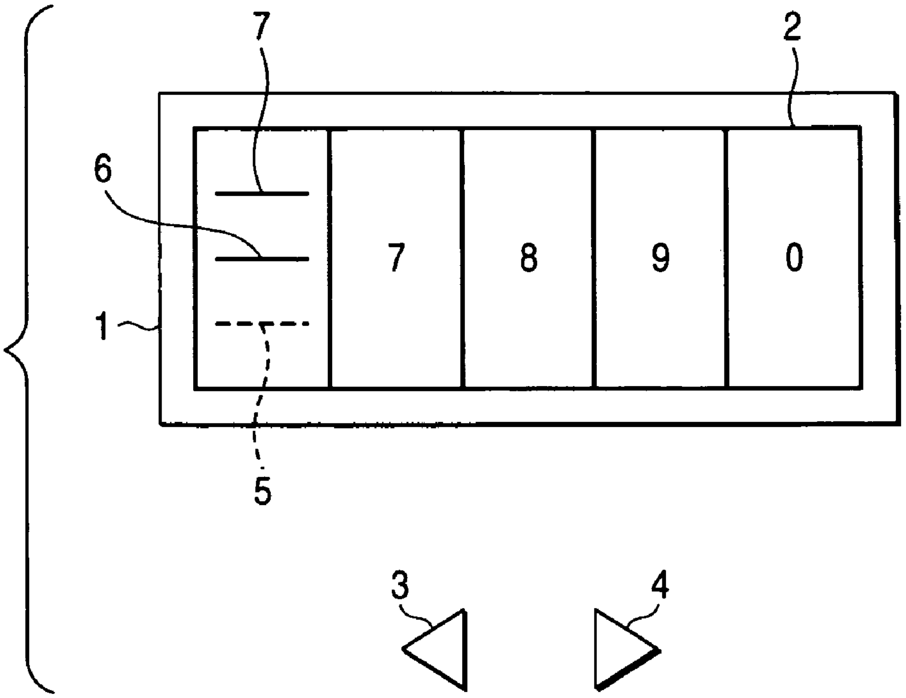
FIG. 3 represents a display example (4 digits of lower order) of the numeral value display device.

FIG. 3 is an example of such a case that 4 digits of a lower order are displayed as to numeral values of "12334567890" of 10 digits expressed by a decimal number. Reference numerals 5, 6, 7 correspond to an indicator for indicating that which numeral portion of the numeral values is being displayed. When 4 digits of the lower order are being displayed, only numeral of "5" is flickered, and reference numerals of both "6" and "7" are turned ON. It should be understood that in this drawing, a broken line indicates "flicker", whereas a solid line shows "turn ON." Also, a combination of reference numerals 5, 6, 7 also indicates that a portion of the numeral value is being displayed presently. Since the left key 3 is depressed, the display is switched to a display of 4 digits of a middle order.

Figure 4:
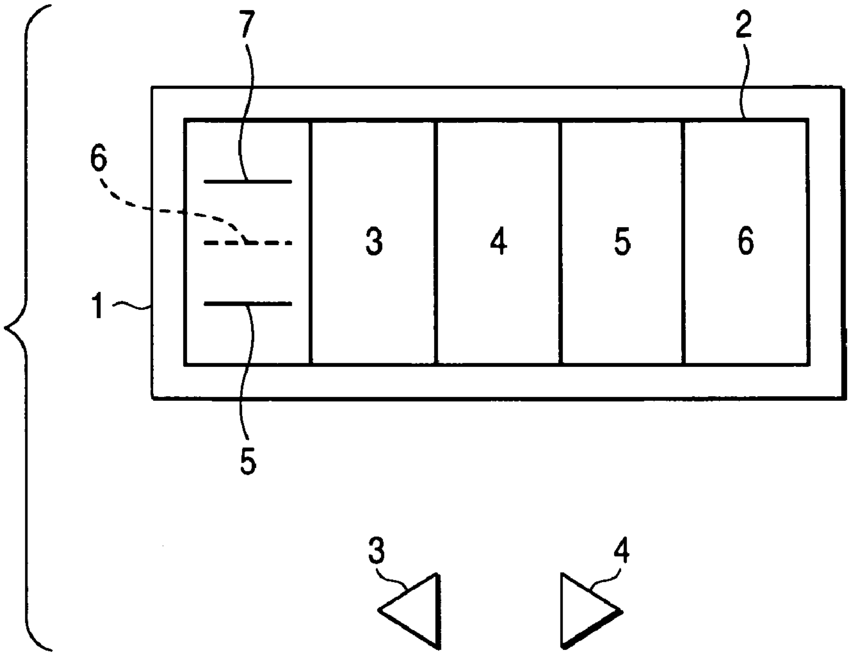
FIG. 4 shows a display example (4 digits of middle order) of the numeral value display device.

FIG. 4 is an example of such a case that 4 digits of the middle order as to the numeral values of "1234567890" are displayed. Only reference numeral of "6" is flickered, and reference numerals of both "5" and "7" are turned ON. Further, since the left key 3 is depressed, the display is switched to a display of 2 digits of an upper order.

Figure 5:
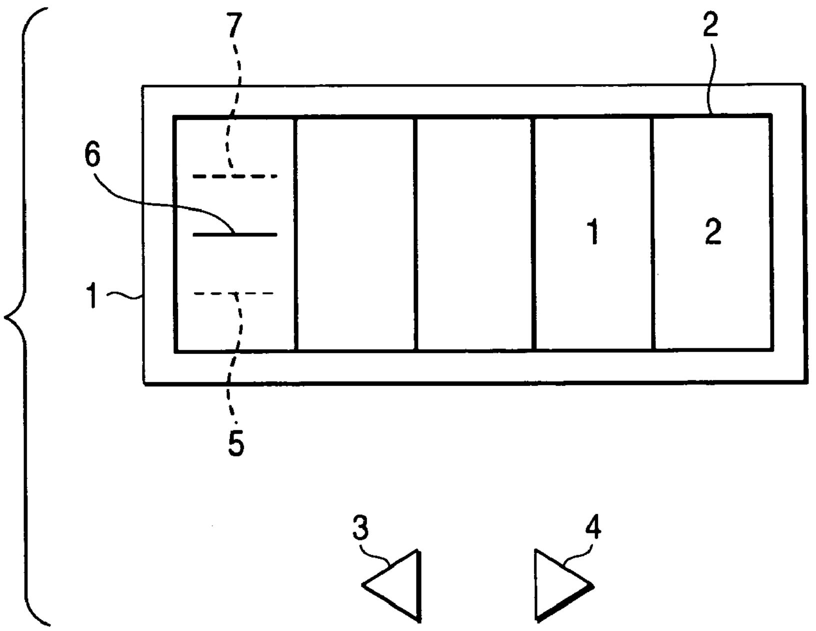
FIG. 5 represents a display example (2 digits of upper order) of the numeral value display device.

FIG. 5 is an example of such a case that 2 digits of the upper order as to the numeral values of 1234567890 are displayed. Only reference numeral of "7" is flickered, and reference numerals of both "5" and "6" are turned ON. Now, if the right key 4 is depressed, then a display is made as shown in FIG. 4. When the right key 4 is again depressed, then a display is made as indicated in FIG. 3.

Since the first embodiment is arranged as explained above a portion of the numeral value having the layer digit number than the digit number of the numeral value display device is displayed, and since this displayed portion of the numeral value is switched, the base of the display need not be changed. As a result, there is no opportunity that the display of the portion of the numeral value can be hardly understood by the operator, and further, the operation feelings are not considerably deteriorated.

It should also be understood that although the numeral value is divided into the three numeral values in the first embodiment, a numeral value may be alternatively subdivided not only by 3, but also by an arbitrarily selected number, depending upon a digit number of this numeral value and also a displayable digit number. Also, in the first embodiment, the indicator for indicating that which numeral portion of the numeral value is being displayed is realized by the three bars. Alternatively, the display form may be arbitrarily determined for instance, the indicator may be realized by employing a circle and a dot.

Second Embodiment

Next, a description is made of a second embodiment.

Figure 6:
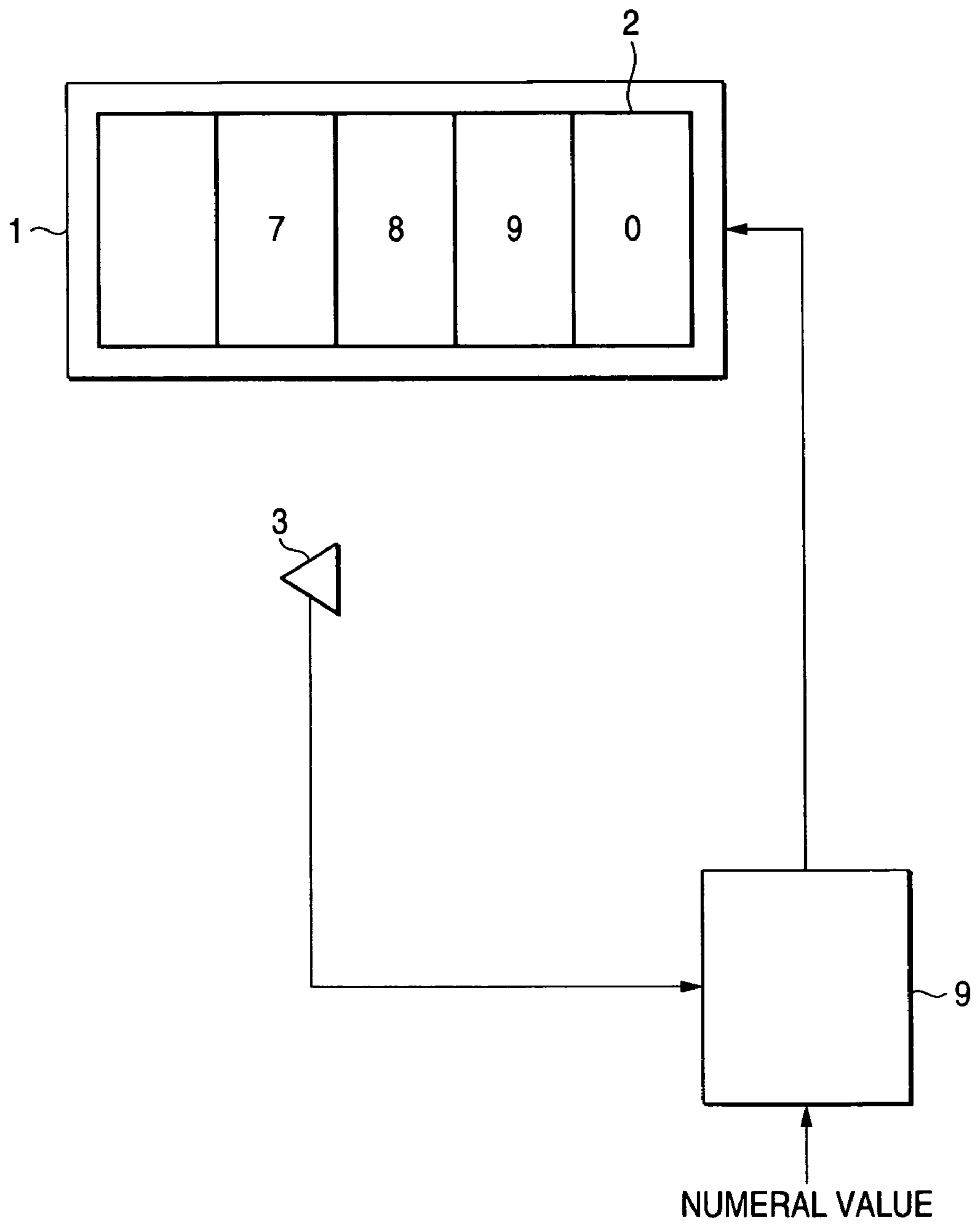
FIG. 6 is a structural diagram for showing a numeral value display apparatus which indicates a second embodiment of the present invention.
Figure 7:
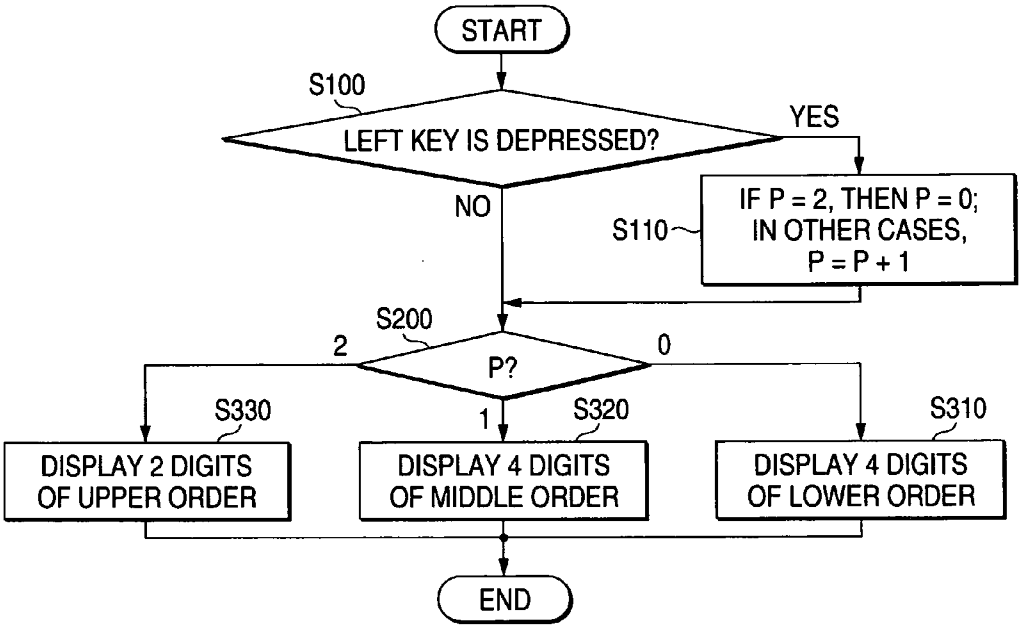
FIG. 7 is a flow chart for describing a display process operation.

FIG. 6 and FIG. 7 show a structural diagram of a numeral value display apparatus in the case that only a left key is provided, and a flow chart for describing process operations thereof, respectively.

The second embodiment owns a different point from that of the first embodiment. That is, while the operation key is constituted only by the left key 3, the display processing unit 8 includes: a member (corresponding to steps S100 and S110 of FIG. 7 and will be explained later) for incrementing the display unit variable "P" up to a preset maximum value when the left key 3 is depressed and for changing the maximum value into "0"; and a member (corresponding to steps S200, S310, S320, S330 of FIG. 7, and will be discussed later) for switching a numeral portion to be displayed based upon the value of the display unit variable "P" to display the switched numeral portion.

A description is made of FIG. 7. While the variable "P" takes 0, 1, 2 as the values thereof, when the display unit variable "P" corresponds to each of these values, 4 digits of a lower order are displayed; 4 digits of a middle order are displayed; and 2 digits of an upper order are displayed. Explanations of the display process operations every step are given as follows:

S100: In the case that the left key is depressed, the display process operation is advanced to a step S110. In the case that the left key is not depressed, the display process operation is advanced to a step S200.

S110: If "P" is equal to 2, then "P" is changed to "0." In other cases, "1" is added to "P." The value of "P" is changed to 0→1→2→0 every time the left key is depressed.

S200: "P" corresponds to any one of "0", "1", and "2". When "P" corresponds to "0", the display process operation is advanced to a step S310. When "P" corresponds to "1", the display process operation is advanced to a step S320. When "P" corresponds to "2", the display process operation is advanced to a step S330.

S310: 4 digits of a lower order are displayed.

S320: 4 digits of a middle order are displayed.

S330: 2 digits of an upper order are displayed.

Since the second embodiment is arranged as explained above, a portion of the numeral value having the larger digit number than the digit number of the numeral value display device is displayed, and since this displayed portion of the numeral value is switched, the base of the display need not be changed. As a result, there is no opportunity that the display of the portion of the numeral value can be hardly understood by the operator, and further, the operation feelings are not considerably deteriorated.

It should also be understood that although the above-explained embodiment has exemplified such a case that the operation key is the left key, the operation key may be alternatively realized by a right key.

Third Embodiment

Figure 8:
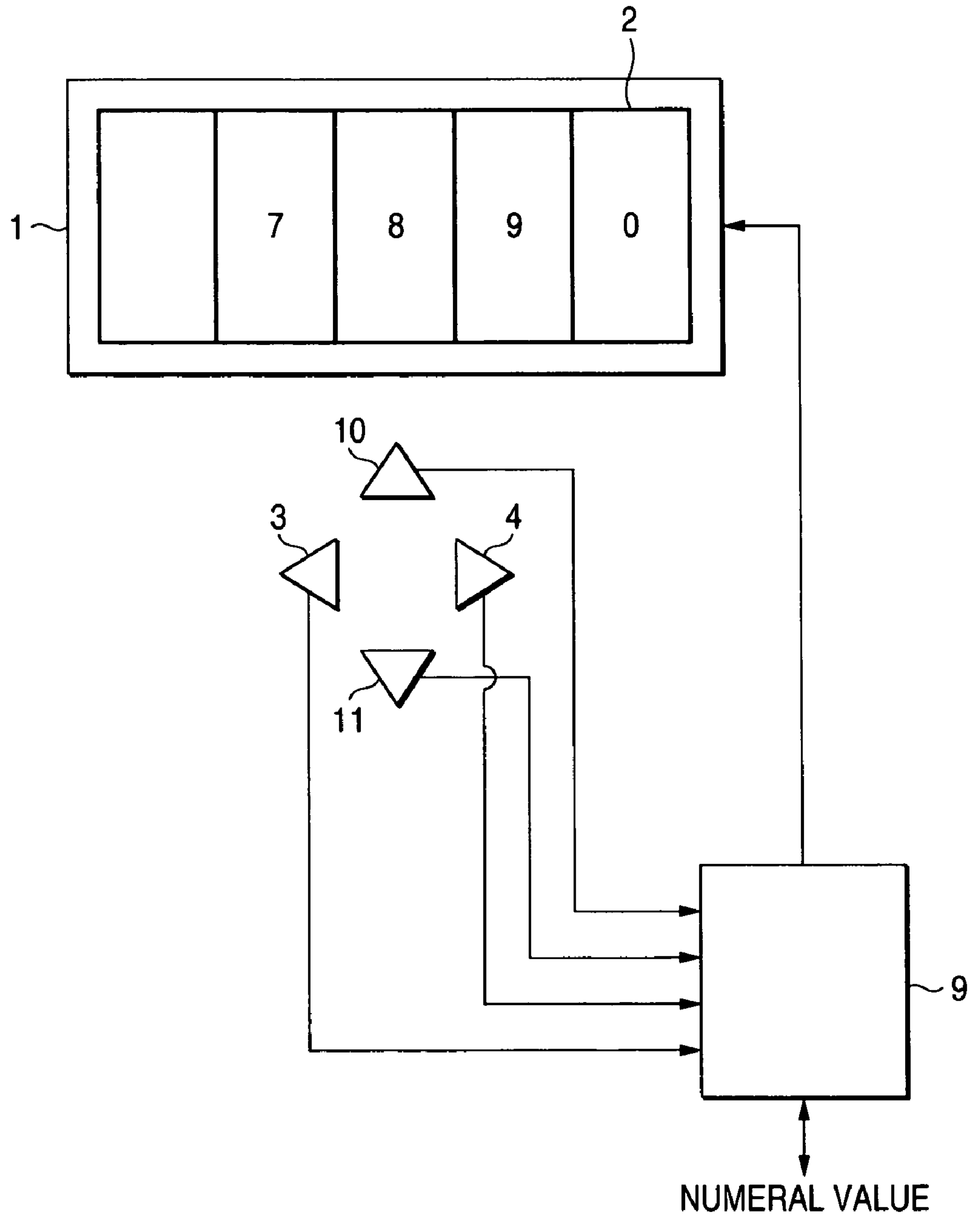
FIG. 8 is a structural diagram for showing a numeral value display apparatus which indicates a third embodiment of the present invention.

FIG. 8 is a structural diagram of a third embodiment of the present invention.

Reference numeral 1 shows a numeral value display device, and reference numeral 2 represents one of display units which constitute the numeral value display device 1, and can display one digit of numeral indication. Reference numerals 3 and 4 show a left key and a right key, respectively. Reference numeral 9 shows a display processing unit to which an editing digit variable is set. Reference numerals 10 and 11 represent an up key and a down key, respectively, which are used so as to edit a numeral value.

The third embodiment owns a different point from the first and second embodiments. That is, while the operation keys include the up key 10 and the down key 11 in addition to the left key 3 and the right key 4, an editing digit variable "d" is set to the display processing unit 9, and this editing digit variable "d" is required so as to edit a portion of a numeral value, which is displayed on the display device every dividing digit number. The display processing unit 9 includes a member (corresponding to steps S100, S110 in FIG. 9, and will explained later) for incrementing an editing digit when the up key 10 is depressed; a member (corresponding to steps S200, S210 in FIG. 9, and will be explained later) for decrementing the editing digit when the down key 11 is depressed; a member (corresponding to steps S300, S310 in FIG. 9, and will be discussed later) for incrementing an editing digit variable when the left key 3 is depressed; a member (corresponding to steps S400, S410 in FIG. 9, and will be discussed later) for decrementing the editing digit variable "d" when the right key 4 is depressed; a member (corresponding to step S500 in FIG. 9, and will be explained later) for determining a value of a display unit variable "P" based upon the value of the editing digit variable "d"; and a member (corresponding to steps S600, S610, S620, S630 in FIG. 9, and will be discussed later) for switching a portion of a numeral value to be displayed based upon the value of the display unit variable "P" to display the switched portion of the numeral value, and also for clearly displaying the relevant editing digit.

Figure 9:
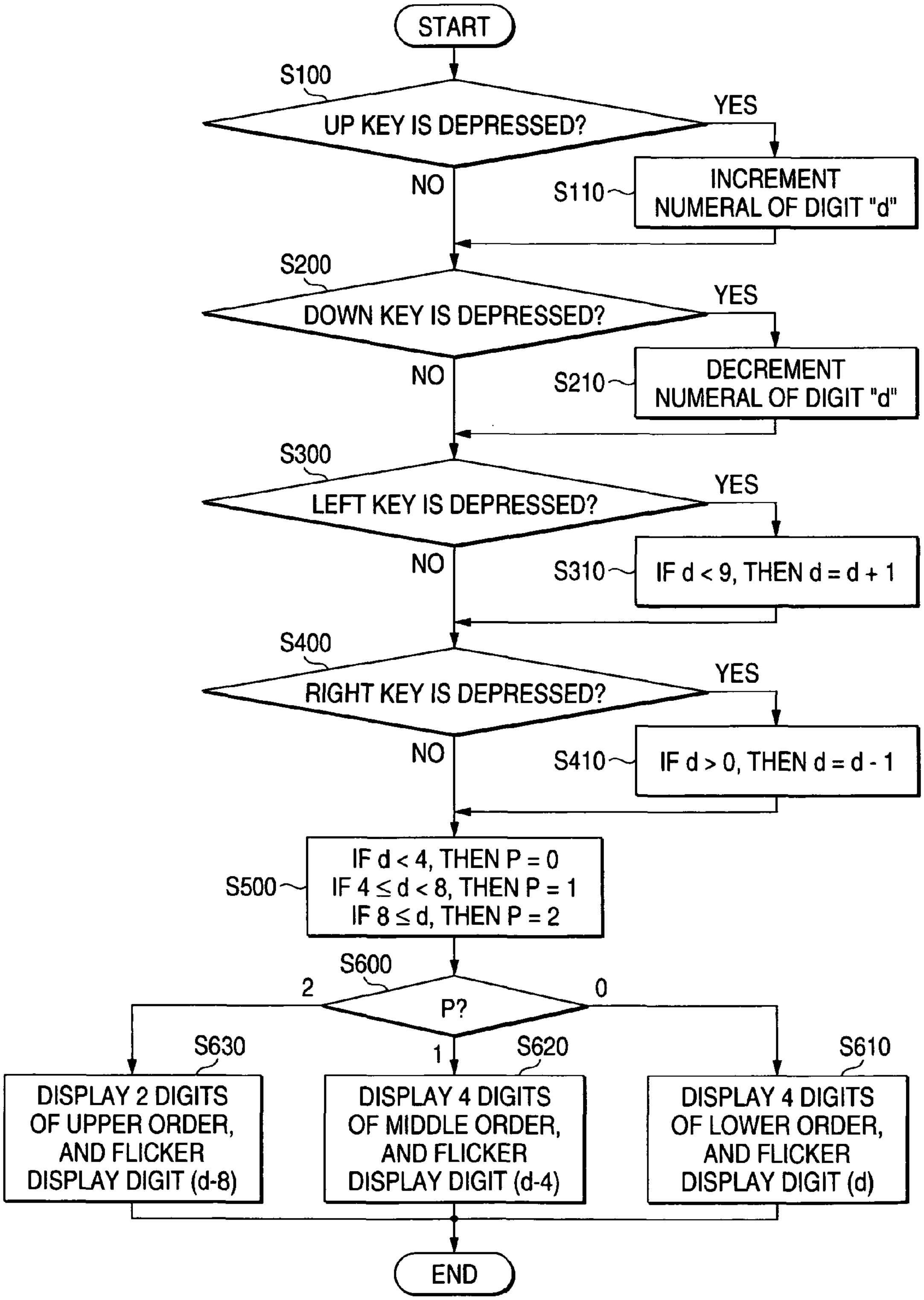
FIG. 9 is a flow chart for describing a display editing process operation.

FIG. 9 is a flow chart for explaining a display editing process operation. In this embodiment, a decision is made that which digit of a numeral value is edited based upon an editing digit variable "d", and then, a portion of the numeral value to be displayed is determined based upon the determined digit.

While the editing digit variable "d" corresponds to an editing digit position of a numeral value, if the numeral value corresponds to 10 digits, then the variable takes values of "0" to "9." A portion of the numeral value to be displayed is determined based upon the value of the editing digit variable "d." Explanations of the display editing process operation every step are given as follows:

S100: in the case that the up key is depressed, the display editing process operation is advanced to a step S110. In the case that the up key is not depressed, the display editing process operation is advanced to a step S200.

S110: A numeral of a digit "d" is incremented.

S200: In the case that the down key is depressed, the display editing process operation is advanced to a step S210. In the case that the down key is not depressed, the display editing process operation is advanced to a step S300.

S210: The numeral of the digit "d" is decremented.

S300: In the case that the left key is depressed, the display editing process operation is advanced to a step S310. In the case that the left key is not depressed, the display editing process operation is advanced to a step S400.

S310: When "d" is smaller than 9, 1 is added to "d." When "d" is equal to 9, this "d" remains.

S400: In the case that the right key is depressed, the display editing process operation is advanced to a step S410. In the case that the right key is not depressed, the display process operation is advanced to a step S500.

S410: When "d" is larger than "0", 1 is subtracted from "d." When "d" is equal to "0", this "d" remains.

S500: If d<4, then "P" is set to "0." If 4<=d<8, then "P" is set to "1." If 8<=d, then "P" is set to "2."

S600: "P" corresponds to any one of "0", "1", and "2." When "P" corresponds to "0", the display editing process operation is advanced to a step S610. When "P" corresponds to "1", the display editing process operation is advanced to a step S620. When "P" corresponds to "2", the display editing process operation is advanced to a step S630.

S610: 4 digits of a lower order are displayed. The display digit "d" is flickered.

S620: 4 digits of a middle order are displayed. A display digit (d-4) is flickered.

S630: 2 digits of an upper order are displayed. A display digit (d-8) is flickered.

Figure 10:
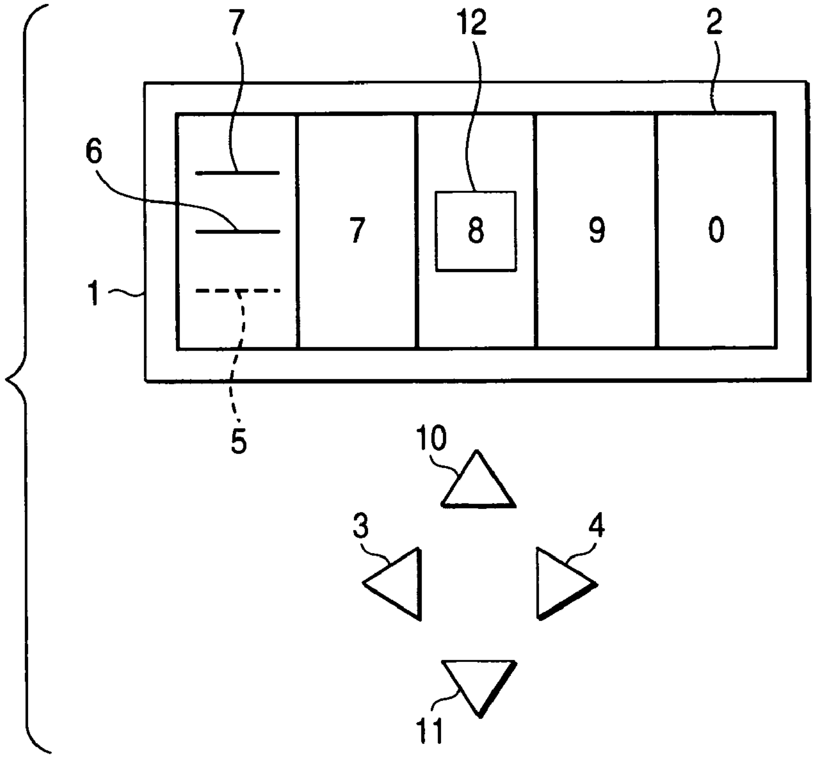
FIG. 10 represents a display example (4 digits of lower order) of the numeral value display device.

FIG. 10 is a display example of such a case that an editing digit is equal to 2 as to numeral values of "1234567890" of 10 digits expressed by a decimal number. 4 digits of a lower order of the numeral values are being displayed. Reference numerals 5, 6, 7 correspond to an indicator for indicating that which numeral portion of the numeral values is being displayed, and a meaning of an indication is similar to that of FIG. 3. Reference numeral 12 corresponds to an editing digit, and is flickered. If the key 10 is depressed, then the numeral of the editing digit is increased. If the key 11 is depressed, then the numeral of the editing digit is decremented. If the key 4 is depressed, then the numeral of the editing digit is moved along a right direction. If the key 3 is depressed, then the numeral of the editing digit is moved along a left direction. When the key 3 is depressed and then the editing digit exceeds 3, the display is switched to a display of 4 digits of a middle order.

Since the third embodiment is arranged as explained above, a portion of the numeral value having the larger digit number than the digit number of the numeral value display device is displayed, and since this displayed portion of the numeral value is switched, the base of the display need not be changed. As a result, there is no opportunity that the display of the portion of the numeral value can be hardly understood by the operator, and further, the operation feelings are not considerably deteriorated.

Fourth Embodiment

Figure 11:
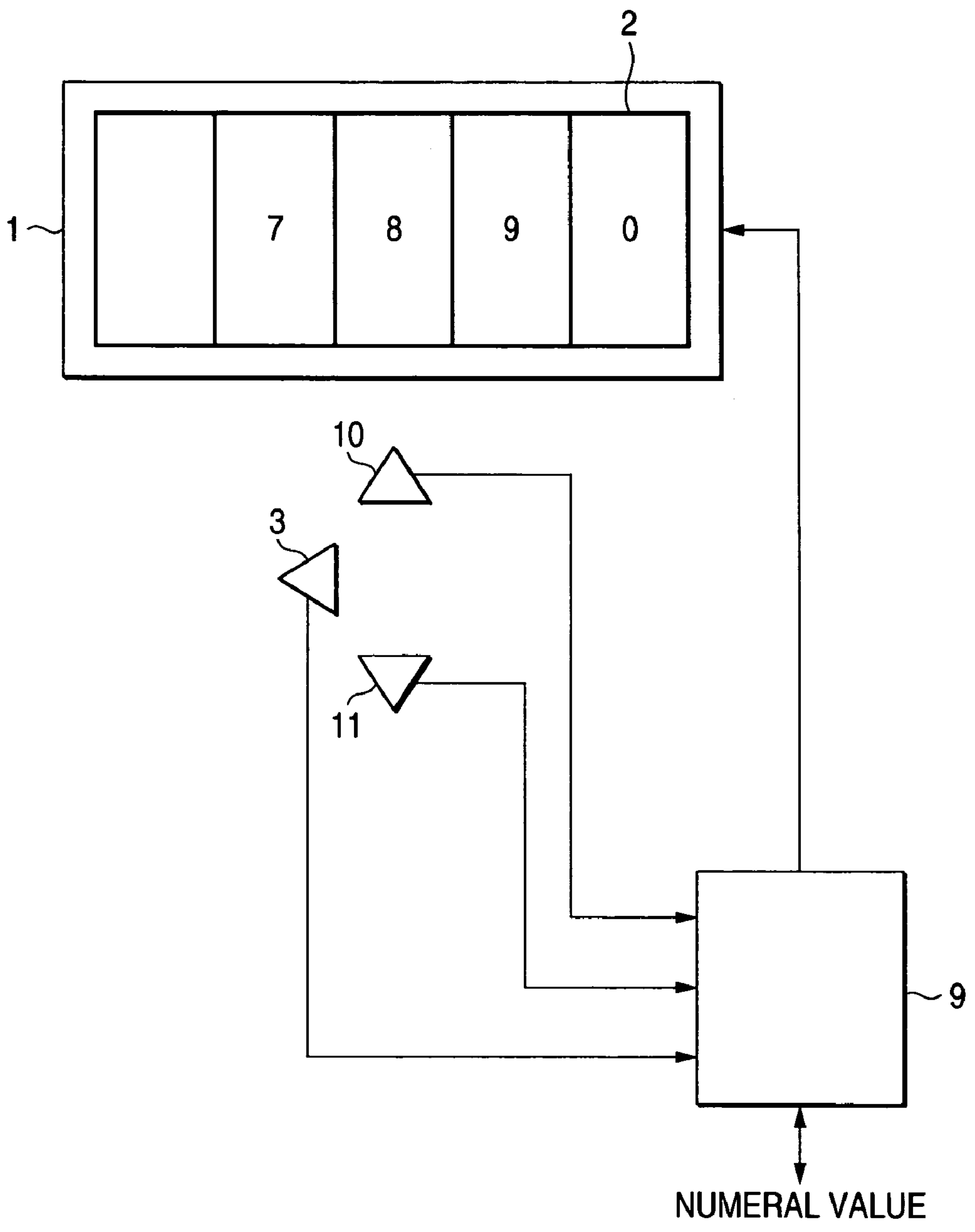
FIG. 11 is a structural diagram for showing a numeral value display apparatus which indicates a fourth embodiment of the present invention.

FIG. 11 is a structural diagram of a fourth embodiment of the present invention.

Reference numeral 1 shows a numeral value display device, and reference numeral 2 represents one of display units which constitute the numeral value display device 1, and can display one digit of a numeral indication. Reference numerals 3 shows a left key. There is no right key. Reference numeral 9 shows a display processing unit to which an editing digit variable is set. Reference numerals 10 and 11 represent an up key and a down key, respectively, which are used so as to edit a numeral value.

The fourth embodiment owns a different point from the first, second and third embodiments. That is, while the operation keys include the up key 10 and the down key 11 in addition to one left key 3, an editing digit variable "d" is set to the display processing unit 8, and this editing digit variable "d" is required so as to edit a portion of a numeral value, which is displayed on the display device every dividing digit number. The display processing unit 8 includes a member (corresponding to steps S100, S110 in FIG. 12, and will explained later) for incrementing an editing digit when the up key 10 is depressed; a member (corresponding to steps S200, S210 in FIG. 12, and will be explained later) for decrementing the editing digit when the down key 11 is depressed; a member (corresponding to steps S300, S310 in FIG. 12, and will be discussed later) for incrementing an editing digit variable until the digit is reached to an uppermost order digit, and for changing the uppermost order digit to 0; a member (corresponding to step S400 in FIG. 12, and will be discussed later) for determining a value of a display unit variable "P" based upon the value of the editing digit variable; and a member (corresponding to steps S500, S510, S520, S530 in FIG. 12, and will be discussed later) for switching a portion of a numeral value to be displayed based upon the value of the display unit variable "P" to display the switched portion of the numeral value, and also for clearly displaying the relevant editing digit.

Figure 12:
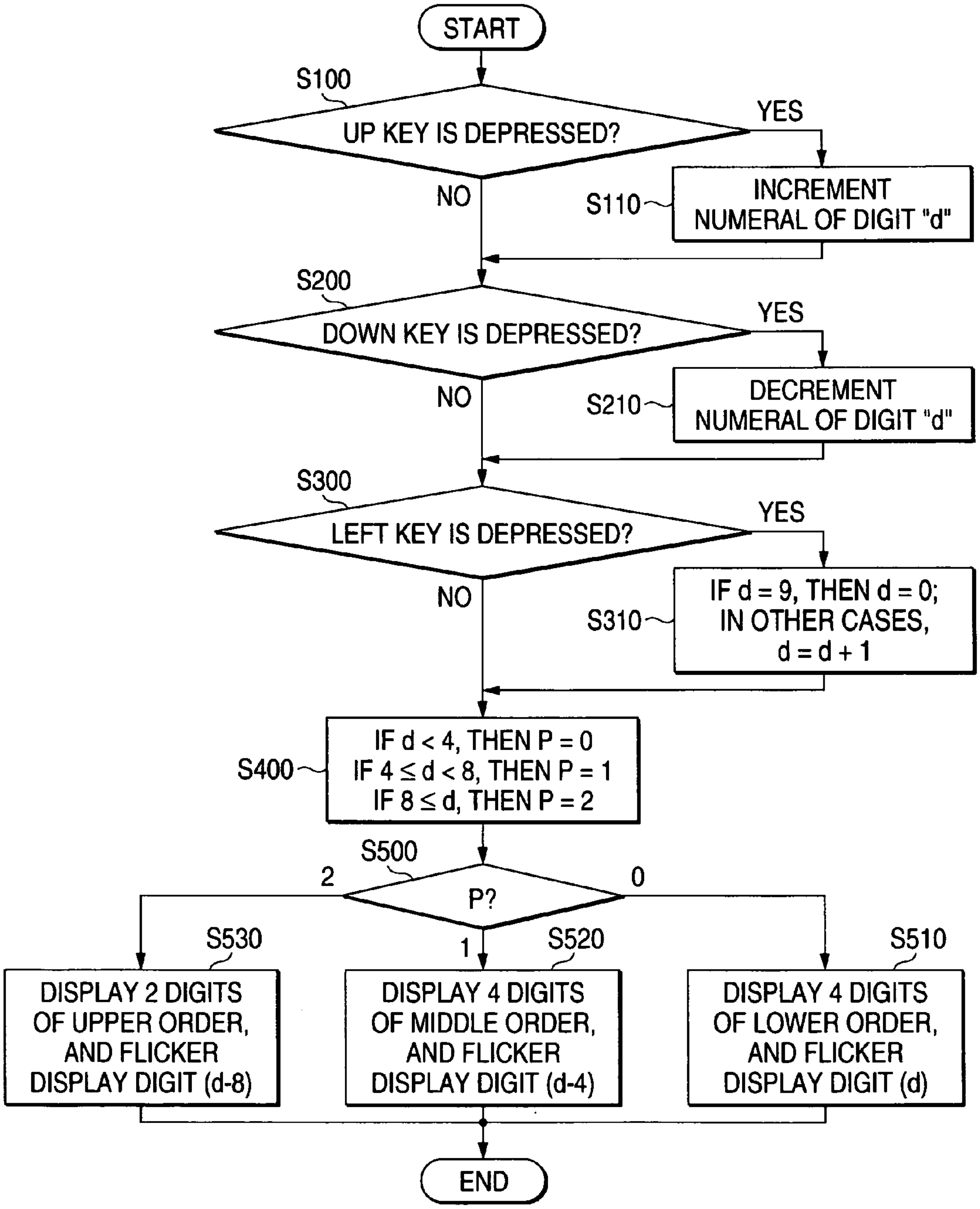
FIG. 12 is a flow chart for describing a display editing process operation.

FIG. 12 is a flow chart for explaining a display editing process operation. In this embodiment, a decision is made that which digit of a numeral value is edited based upon an editing digit variable "d", and then, a portion of the numeral value to be displayed is determined based upon the determined digit.

While the editing digit variable "d" corresponds to an editing digit position of a numeral value, if the numeral value corresponds to 10 digits, then this numeral value takes values of "0" to "9." A portion of the numeral value to be displayed is determined based upon the value of the editing digit variable "d." Explanations of the display editing process operation every step are given as follows:

S100: in the case that the up key is depressed, the display editing process operation is advanced to a step S110. In the case that the up key is not depressed, the display editing process operation is advanced to a step S200.

S110: A numeral of a digit "d" is incremented.

S200: In the case that the down key is depressed, the display editing process operation is advanced to a step S210. In the case that the down key is not depressed, the display editing process operation is advanced to a step S300.

S210: The numeral of the digit "d" is decremented.

S300: In the case that the left key is depressed, the display editing process operation is advanced to a step S310. In the case that the left key is not depressed, the display editing process operation is advanced to a step S400.

S310: If "d" is equal to 9, then "d" is set to "0." If "d" is equal to any other numerals than 9, then 1 is added to d. The value of "d" is changed into 0→1→2→ . . . →8→9→0 every time the left key is depressed.

S400: If d<4, then "P" is set to "0." If 4<=d<8, then "P" is set to "1." If 8<=d, then "P" is set to "2."

S500: "P" corresponds to any one of "0", "1", and "2". When "P" corresponds to "0", the display editing process operation is advanced to a step S510. When "P" corresponds to "1", the display editing process operation is advanced to a step S520. When "P" corresponds to "2", the display editing process operation is advanced to a step S530.

S510: 4 digits of a lower order are displayed. The display digit "d" is flickered.

S520: 4 digits of a middle order are displayed. A display digit (d-4) is flickered.

S530: 2 digits of an upper order are displayed. A display digit (d-8) is flickered.

Since the fourth embodiment is arranged as explained above, a portion of the numeral value having the larger digit number than the digit number of the numeral value display device is displayed, and since this displayed portion of the numeral value is switched, the base of the display need not be changed. As a result, there is no opportunity that the display of the portion of the numeral value can be hardly understood by the operator, and further, the operation feelings are not considerably deteriorated.

It should also be understood that although the above-described embodiment has exemplified such a case that the operation key is the left key, this operation key may be alternatively realized by the right key.

Also, similar to the first embodiment, in accordance with both the third embodiment and the fourth embodiment, the subdivision of the numeral value may not be limited only to the three subdivisions. Also, the indicator for indicating that which portion of the numeral value is displayed may not be limited only the three bars. Furthermore, the method for representing the editing digit may not be limited only to the flickering method, but may be realized by way of, for instance, an under line, or the like.

INDUSTRIAL APPLICABILITY

As previously described, the present invention is useful as the system for displaying the numeral value in the drive control apparatus.

[FIG. 1]
A1: numeral value

[FIG. 2]
A1: start
A2: end
S100: left key is depressed?
S110: if P<2, then P=P+1
S200: right key is depressed?
S210: if P>0, then P=P−1
S430: display 2 digits of upper order
S420: display 4 digits of middle order
S410: display 4 digits of lower order

[FIG. 6]
A1: numeral value;

[FIG. 7]
A1: start
A2: end
S100: left key is depressed?
S110: if P=2, then P=0. In other cases, P=P+1
S330: display 2 digits of upper order
S320: display 4 digits of middle order
S310: display 4 digits of lower order

[FIG. 8]
A1: numeral value

[FIG. 9]
A1: start
A2: end
S100: up key is depressed?
S110: increment numeral of digit "d"
S200: down key is depressed?
S210: decrement numeral of digit "d"
S300: left key is depressed?
S310: if d<9, then d=d+1
S400: right key is depressed?
S410: if d>0, then d=d−1
S500: if d<4, then P=0
if 4<=d<8, then P=1
if 8<=d then P=2
S630: display 2 digits of upper order, and flicker display digit (d-8)
S620: display 4 digits of middle order, and flicker display digit (d-4)
S610: display 4 digits of lower order, and flicker display digit (d)

[FIG. 11]
A1: numeral value

[FIG. 12]
A1: start
A2: end
S100: up key is depressed?
S110: increment numeral of digit "d"
S200: down key is depressed?
S210: decrement numeral of digit "d"
S300: left key is depressed?
S310: if d=9, then d=0; in other cases, d=d+1
S400: if d<4, then P=0
if 4<=d<8, then P=1
if 8<=d then P=2
S530: display 2 digits of upper order, and flicker display digit (d-8)
S520: display 4 digits of middle order, and flicker display digit (d-4)
S510: display 4 digits of lower order, and flicker display digit (d)

The invention claimed is:

1. A numeral value display system comprising:

a numeral value display device for displaying information of a numeral value, a display processing unit executing to subdivide the numeral value into a preset digit number and to display a portion of the subdivided numeral values, if a digit number of the numeral value to be displayed is larger than a displayable digit number of the numeral value display device, and an operation key for switching the display of the numeral value display device in a manual manner and for editing the numeral value, wherein while an editing digit variable is set to the display processing unit, the editing digit variable representing an editing digit position is required so as to edit a portion of a numeral value, which is displayed on the numeral value display device every dividing digit number, the operation key includes: an up key for depressing to increment an editing digit; a down key for depressing to decrement an editing digit; a left key for depressing to increment the editing digit variable; and a right key for depressing to decrement the editing digit variable, in the numeral editing, and the display processing unit executes: incrementing an editing digit when the up key is depressed; decrementing the editing digit when the down key is depressed; incrementing an editing digit variable when the left key is depressed; decrementing the editing digit variable when the right key is depressed; determining a value of a display unit variable based upon the value of the editing digit variable; and switching a portion of a numeral value to be displayed based upon the value of the display unit variable to display the switched portion of the numeral value and for to clearly display the relevant editing digit.

2. A numeral value display system comprising:

a numeral value display device for displaying information of a numeral value, a display processing unit executing to subdivide the numeral value into a preset digit number and to display a portion of the subdivided numeral values, if a digit number of the numeral value to be displayed is larger than a displayable digit number of the numeral value display device, and an operation key for switching the display of the numeral value display device in a manual manner and for editing the numeral value, wherein while an editing digit variable is set to the display processing unit, the editing digit variable representing an editing digit position is required so as to edit a portion of a numeral value, which is displayed on the numeral value display device every dividing digit number, the operation key includes: an up key for depressing to increment an editing digit; a down key for depressing to decrement an editing digit; and a left key for depressing to increment the editing digit variable, in the numeral editing, and the display processing unit executes: incrementing an editing digit when the up key is depressed; decrementing the editing digit when the down key is depressed; incrementing an editing digit variable until the digit is reached to an uppermost order digit and for changing the uppermost order digit to 0 when the left key is depressed; determining a value of a display unit variable based upon the value of the editing digit variable; and switching a portion of a numeral value to be displayed based upon the value of the display unit variable to display the switched portion of the numeral value and to clearly display the relevant editing digit.

3. A drive control apparatus comprising the numeral value display system as in claim 1.

4. A drive control apparatus comprising the numeral value display system as in claim 2.

* * * * *